Figure 1:
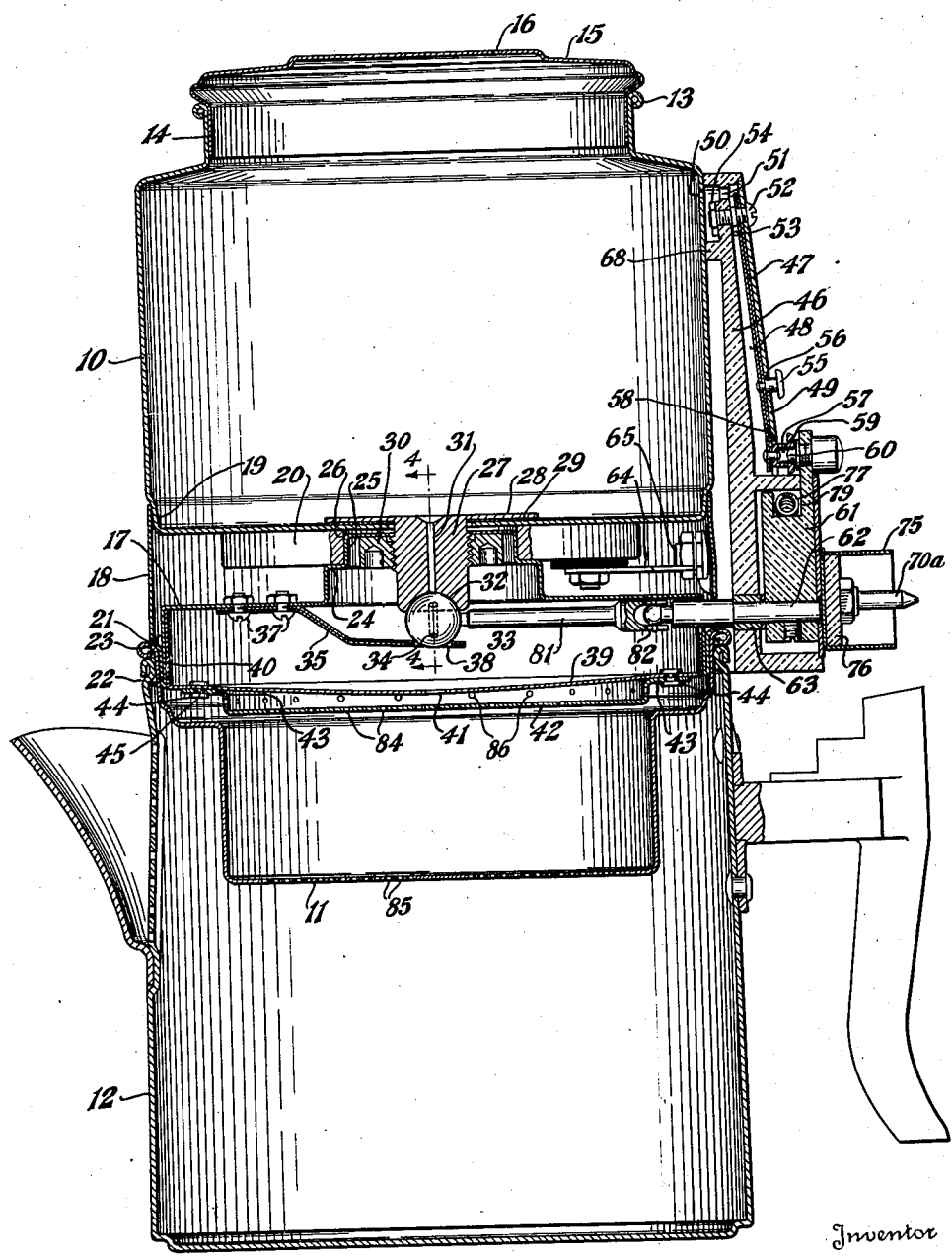

Oct. 29, 1935.  A. C. WILCOX  2,018,695
AUTOMATIC ELECTRIC DRIP COFFEE MAKER
Filed March 8, 1934   2 Sheets-Sheet 1

Inventor
A. C. Wilcox
By Frease and Bishop
Attorneys

Oct. 29, 1935.  A. C. WILCOX  2,018,695
AUTOMATIC ELECTRIC DRIP COFFEE MAKER
Filed March 8, 1934   2 Sheets-Sheet 2
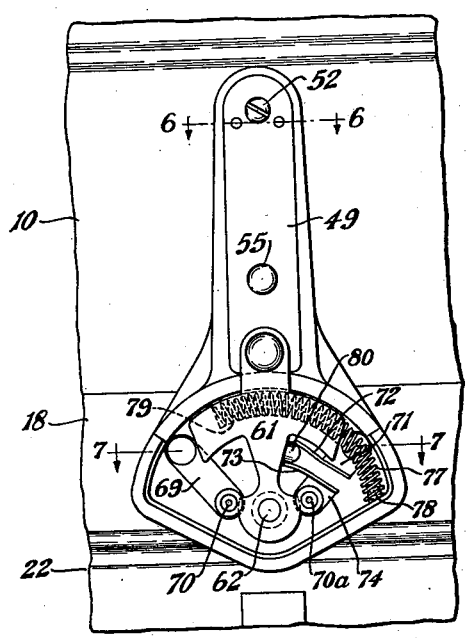
Fig. 2
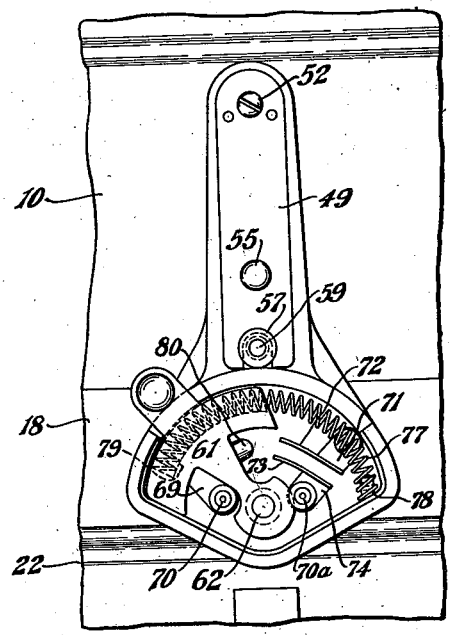
Fig. 3
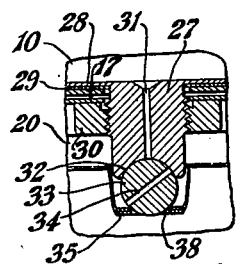
Fig. 4
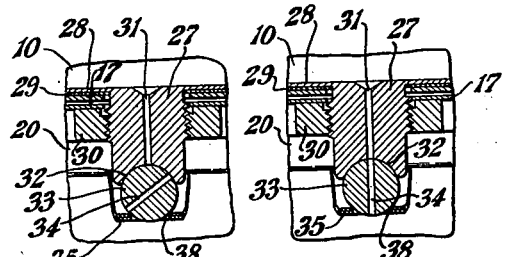
Fig. 5
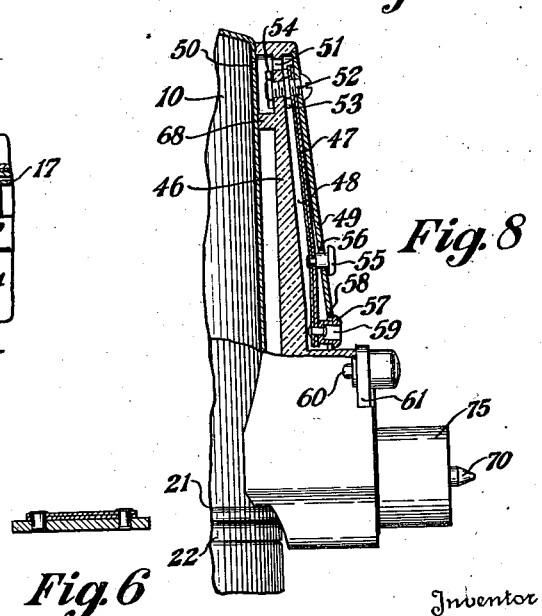
Fig. 8
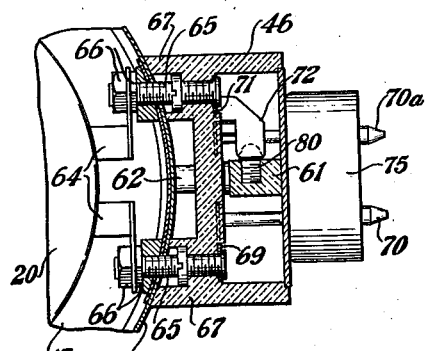
Fig. 7
Fig. 6
Inventor
A. C. Wilcox
By Frease and Bishop
Attorneys Patented Oct. 29, 1935

2,018,695

UNITED STATES PATENT OFFICE 2,018,695

AUTOMATIC ELECTRIC DRIP COFFEE MAKER

Albert C. Wilcox, Massillon, Ohio, assignor to The Enterprise Aluminum Company, Massillon, Ohio, a corporation Ohio Application March 8, 1934, Serial No. 714,669

9 Claims. (Cl. 219—44)

The invention relates to an automatically operating electrically heated drip coffee maker, and the present application is an improvement upon my prior application, Serial No. 623,560, filed July 20, 1932.

The invention in my prior application consists in an automatically operating electric drip coffee maker including a water container and a ground coffee basket located beneath the same, electric means being provided for heating the water in the water container, siphoning means, operated by steam pressure in the water container, being provided for discharging the water from the container through the coffee basket, means being provided for cutting off the heating means when the water in the container reaches the boiling temperature.

The object of the present improvement is to provide means for discharging the water from the water container through the coffee basket when the water reaches the boiling point, but without requiring steam pressure to accomplish the same, and for simultaneously cutting off the electric heating element.

Another object of the improvement is to provide a normally closed valve in the bottom of the water container and means operated by the water reaching the boiling point for automatically opening said valve and discharging the water through the coffee basket and for simultaneously cutting off the electric heating element.

A further object is to provide a valve in the water container operatively connected to a thermally controlled switch in the circuit to the heating element whereby when steam from the water container contacts with the thermally controlled switch the current will be cut off from the heating element and the valve will be opened to discharge the water from the water container through the coffee basket.

A still further object of the improvement is to provide a rotary valve with a bimetal strip for urging the same tightly against its seat as the temperature of the water in the water container is raised.

The above, together with other objects which will be apparent from the drawings and the following description, or which may be later pointed out, may be attained by constructing the improved automatic electric drip coffee maker as illustrated in the accompanying drawings, in which Figure 1 is a vertical sectional view through a preferred embodiment of the automatic electric drip coffee maker, showing the switch and valve in closed position;

Fig. 2, an elevation of the automatic thermally operated switch, showing the same in closed position with the cover plate removed;

Fig. 3, a view similar to Fig. 2, showing the switch in open position;

Fig. 4, a detail sectional view of the valve, taken as on the line 4—4, Fig. 1, the valve being shown in closed position;

Fig. 5, a view similar to Fig. 4, showing the valve in open position;

Fig. 6, a transverse sectional view through the upper end portion of the cover plate for the switch housing and the bi-metal strip on a slightly enlarged scale, taken substantially on the line 6—6, Fig. 2;

Fig. 7, a transverse sectional view through the switch, taken on the line 7—7, Fig. 2; and Fig. 8, a side elevation of the switch, partly in section, showing the switch in open position.

Similar numerals refer to similar parts throughout the drawings.

The improved automatic electric drip coffee maker to which the invention pertains includes generally the water container indicated at 10, the coffee basket indicated at 11, which is adapted to be detachably connected to the lower end of the water container, and the pot or coffee beverage receptacle 12 at the upper end of which the coffee basket is arranged to be supported.

The upper open end of the water container may be provided with the bead 13 and is shaped to receive the depending skirt 14 of the cover 15 in the top of which an air vent 16 may be formed to prevent a vacuum from being produced in the water container when the water is discharged therefrom.

The water container may be provided with a lower shell 17 having the peripheral flange portion 18 tightly fitting the slightly reduced lower end 19 of the water container, forming a chamber at the lower end of the water container for containing the electric heating element 20 by means of which the water in the container may be heated.

This lower shell may be shouldered as at 21 to fit within the upturned peripheral flange 22 provided at the upper end of the coffee basket, and is preferably recessed as at 23 for a purpose to be later explained. The bottom wall of the shell 17 is preferably shouldered as at 24 to contact with the underside of the heating element 20 and is centrally offset as at 25 to be received within the central opening 26 of said heating element.

A stud 27 is located through the bottom wall of the water container and through the shell 17 and is provided at its upper end with a head or flange 28 between which and the bottom of the water container may be located a gasket 29. A nut 30 is provided upon the stud 27 and contacts with the shell 17 drawing the head of the stud tightly against the bottom of the water container and clamping the electric heating element 20 between the bottom of the water container and the shoulder 24 of the shell 17.

A central passage 31 is provided through the stud 27 forming a discharge outlet for the water container, and the lower end of the stud is concaved, forming the substantially half-round valve seat 32 within which the ball valve 33 is seated. The discharge port 34 is formed through the ball 33 and arranged to register with the discharge outlet 31 of the stud 27 when the ball valve is rotated in its seat to open position, as shown in Fig. 5.

The ball valve 33 is arranged to be held tightly seated within the valve seat 32 as by a spring 35 which is preferably formed of bimetal as illustrated. This spring may be fixed at one end to the shell 17 as by bolts or rivets 37, the free end portion being provided with an aperture 38 of considerably less diameter than the ball 33 arranged to receive the lower side of the ball, as shown in the drawings, in order to press the ball tightly against the seat 32.

The valve mechanism may be enclosed as by the closure member 39 provided with the peripheral flange 40 adapted to fit tightly within the recess 23 of the shell 17. This closure 39 is preferably curved or tapered downward toward its center, at which point it is provided with an aperture 41 of suitable size to permit the water discharged through the valve to pass freely therethrough.

The spreader plate 42 is in the form of a perforated disk having the upwardly offset peripheral flange 43 and is so constructed that it may, if desired, be placed loosely upon the top of the coffee basket or, as shown in Fig. 1, may be detachably engaged with headed studs 44 carried by the closure member 39. For this purpose, the apertures 45 in the flange 43, which engage the studs 44, may be in the form of keyhole slots to permit the spreader plate to be quickly and easily attached to or detached from the closure member.

For the purpose of cutting off the current to the electric heating element 20 when the water in the container 10 reaches the boiling point, and at the same time opening the valve to permit the boiling water to be discharged from the water container through the coffee basket, a thermally operated switch is provided. This switch may be located in an insulation housing indicated generally at 46 and mounted upon one side of the water container, being preferably spaced therefrom as illustrated in the drawings in order to permit free circulation of air entirely around the switch housing so that the thermal element thereof will not be operated by heat conducted or radiated from the water container.

This thermal element may be in the form of a bimetal strip 47 located within a chamber 48 formed in the housing and closed by the plate 49 which may be formed of metal. The chamber 48 of the switch housing communicates with the interior of the water container through the bleeder port 50 formed in the water container and the inlet port 51 in the switch housing 46.

The bimetal strip 47 may be connected at its upper end only to the switch housing as by the bolt 52 which also connects the cover plate 49 to the housing, a nut 53 clamping the upper end portion of the bimetal strip to the upper portion of the cover plate 49 and a nut 54 upon the end portion of the bolt 52 fastening the cover plate and bimetal strip to the insulation housing 46.

A headed stud 55 may be fixed to an intermediate portion of the bimetal strip and located through an aperture 56 in the cover plate 49 which is of sufficient size to permit the stud to move freely therethrough, providing means for manually operating the bimetal strip in the event this may be necessary or desirable. A stud 57 is fixed to the lower end of the bimetal strip and is located through an aperture 58 in the cover plate 49, said stud being provided in its outer end with a socket 59 adapted to receive the rounded stud 60 upon the upper end of the insulation arm 61, the lower end of which is fixed to the shaft 62 which is journaled through the bushing 63 in the insulation housing 46.

Bus bars 64 are connected to the heating element 20 and are fixed to the inner ends of the bolts 65, which project through the peripheral flange 18 of the shell 17, as by the nuts 66. The insulation housing 46 is connected to the shell by these bolts 65 and is spaced therefrom as by the bosses 67 which surround these bolts and the boss 68 at the upper end of the housing so that there may be a complete circulation of air entirely around the switch housing, preventing the bimetal strip from being operated by heat conducted or radiated from the water container.

One of these bolts 65 is connected at its outer end to the upper end of a bus bar 69 to the other end of which is connected a contact post 70 adapted to be received in the usual connector plug. The other bolt 66 is connected to a contact member 71 having the angular flange 72 which is spaced from a similar flange 73 upon a contact member 74 connected to the contact post 70a corresponding to the post 70.

A suitable guard or shield 75 may be located around the posts 70 and 70a and insulated therefrom as shown at 76, to receive the usual connector plug.

A coil spring 77 has one end connected to a stud 78 in one side of the insulation switch housing, the other end of the spring being located in a recess 79 in the switch arm 61, for normally urging the arm to the position shown in Fig. 3, in which position the contact stud 80 upon the arm is disengaged from the contact flanges 72 and 73 so as to hold the switch in open position.

The ball valve 33 is provided with a stem 81 fixed thereto and connected to the shaft 62 of the switch arm as by a ball and socket joint indicated generally at 82, whereby the valve is arranged to be operated by said switch arm. With the switch arm in the closed position as shown in Figs. 1 and 2, the ball valve is in closed position as shown in Fig. 4 and with the switch arm in open position as shown in Fig. 3, the ball valve is also in open position as shown in Fig. 5.

In the operation of the improved automatic electric drip coffee maker, with the switch and valve in closed position as shown in Figs. 1, 2 and 4, the desired amount of ground coffee is placed in the coffee basket 11 and the desired amount of cold water is placed in the water container 10, the parts being then assembled as shown in Fig. 1. Any usual and well known form of connector plug electrically connected to a suitable source of electric current is then connected to the contact posts 70 and 70a and the circuit to the heating element 20 being closed by the contact stud 80 bridging the gap between the contact flanges 72 and 73, current is furnished to the heating element.

The water in the water container 10 is thus heated by the electric heating element and when the water reaches the boiling temperature, steam will be discharged from the boiling water in the water container through the bleeder port 50 and inlet port 51 to the chamber 48 of the switch housing, the steam contacting with the bimetal strip 47 and causing the same to warp or bend to the position shown in Fig. 8, disengaging the socket 59 carried thereby from the stud 60 upon the switch arm 61, permitting the spring 77 to throw said switch arm to the open position as shown in Figs. 3 and 8, thus disengaging the contact stud 80 from the contact flanges 72 and 73 and breaking the circuit to the heating element.

As the switch arm 61 is swung to the open position it will rotate the shaft 62 and through the ball and socket joint 82 and stem 81 the ball valve 33 will be rotated to the open position as shown in Fig. 5, permitting the hot water from the water container to be discharged through the opening 34 in the ball, and through the opening 41 in the closure member 39, the water being distributed over the spreader plate 42 and through the apertures 84 therein to the coffee basket, passing through the ground coffee, the finished coffee beverage dripping through the perforated bottom 85 of the coffee basket into the pot or receptacle 12. Any surplus of water which is not rapidly carried off through the apertures 84 in the bottom of the spreader plate may pass out through the apertures 86 around the periphery thereof.

It will be seen that at all times during the operation of the device, the ball 33 will be held tightly against the seat 32 by means of the spring 35, and by forming this spring of bimetal, it will be seen that as the temperature increases, the spring will warp or bend upward against the ball urging the same more tightly toward the seat, thus assuring a tight fit between the ball and seat and preventing any leakage of water from the water container until the valve is moved to open position by the operation of the thermally controlled switch.

From the above it will be evident that the improved drip coffee maker does not depend upon steam pressure to operate the means for discharging the water from the water container but operates merely by the raising of the water to the boiling temperature, thus obviating the necessity of providing a steam-tight closure for the water container so that the valve will be automatically operated regardless of whether or not the lid is tightly engaged upon the water container.

I claim:

1. A drip coffee maker including a water container, a coffee basket beneath said water container, a rotary valve at the lower end of said water container, an electric heating element for heating the water in the container, and a thermally operated switch having a rotary switch member operated by steam produced by boiling of the water for cutting out said heating element and operating said valve to discharge the water from the water container through said coffee basket.

2. A drip coffee maker including a water container, a coffee basket beneath said water container, an electric heating element for heating the water in the container, a concave valve seat at the lower end of the water container, a ball valve rotatable in said valve seat, and a thermally operated switch having a rotary switch member operatively connected to said ball valve and operated by steam produced by boiling of the water for cutting out said heating element and rotating said ball valve to discharge the water from the water container through said coffee basket.

3. A drip coffee maker including a water container, a coffee basket beneath said water container, an electric heating element for heating the water in the container, a concave valve seat at the lower end of the water container, a ball valve rotatable in said valve seat, a spring for holding said ball valve snugly against the valve seat, and a thermally operated switch having a rotary switch member operatively connected to said ball valve and operated by steam produced by boiling of the water for cutting out said heating element and rotating said ball valve to discharge the water from the water container through said coffee basket.

4. A drip coffee maker including a water container, a coffee basket beneath said water container, an electric heating element for heating the water in the container, a concave valve seat at the lower end of the water container, a ball valve rotatable in said valve seat, a bimetal spring for holding said ball valve snugly against the valve seat, and a thermally operated switch having a rotary switch member operatively connected to said ball valve and operated by steam produced by boiling of the water for cutting out said heating element and rotating said ball valve to discharge the water from the water container through said coffee basket.

5. A drip coffee maker including a water container, a coffee basket beneath said water container, means for heating the water in the container, a concave valve seat at the lower end of the water container, a ball valve rotatable in said valve seat, and a bimetal spring for holding said ball valve snugly against the valve seat.

6. A drip coffee maker including a water container, a coffee basket beneath said water container, means for heating the water in the container, a concave valve seat at the lower end of the water container, a ball valve rotatable in said valve seat, a bimetal spring for holding said ball valve snugly against the valve seat, and thermally controlled means for opening said valve to discharge the water from the water container through the coffee basket when the water reaches a predetermined temperature.

7. A drip coffee maker including a water container, a coffee basket beneath said water container, means for heating the water in the container, a concave valve seat at the lower end of the water container, a ball valve rotatable in said valve seat, a stem fixed to said ball valve, thermally operated means including an arm, a shaft fixed to the arm, a ball and socket joint connecting the shaft to said stem, a spring normally urging the arm toward a position to open the valve, and a bimetal member for holding the arm against movement by the spring, said bimetal member being arranged to be operated when the water in the container reaches a predetermined temperature to release said arm and permit the spring to move the arm to a position to open the valve.

8. A drip coffee maker including a water container, a coffee basket beneath said water container, a valve at the lower end of said water container, an electric heating element for heating the water in the container, a switch controlling said heating element, a spring for normally urging the valve and the switch to open position, and a bimetal member for holding the valve and the switch against movement by said spring, said bimetal member being arranged to be operated when the water in the container reaches a predetermined temperature to release the valve and switch and permit the spring to open the valve and switch.

9. A drip coffee maker including a water container, a coffee basket beneath the water container, electric means for heating water in the container, a concave valve seat at the lower end of the water container, a ball valve rotatable in the valve seat, a stem fixed to said ball valve, an arm operatively connected to the stem, a switch controlling said heating means operated by said arm, spring means normally urging said arm toward a position to open the valve and the switch, and a bimetal member for holding the arm against movement by the spring, said bimetal member being arranged to be operated when the water in the container reaches a predetermined temperature to release said arm and permit the spring to move the arm to a position to open the valve and the switch.

ALBERT C. WILCOX.